US011939932B2

(12) United States Patent
Dussardier et al.

(10) Patent No.: US 11,939,932 B2
(45) Date of Patent: Mar. 26, 2024

(54) METHOD, PROGRAM PRODUCT AND COMPUTER FOR ESTIMATING THE STATIC FLOW RATE OF A PIEZOELECTRIC INJECTOR

(71) Applicant: VITESCO TECHNOLOGIES GMBH, Regensburg (DE)

(72) Inventors: Quentin Dussardier, Toulouse (FR); Morgan Drouyer, Toulouse (FR); Edouard Gambier, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/011,463

(22) PCT Filed: Jul. 1, 2021

(86) PCT No.: PCT/EP2021/068254
§ 371 (c)(1),
(2) Date: Dec. 19, 2022

(87) PCT Pub. No.: WO2022/017759
PCT Pub. Date: Jan. 27, 2022

(65) Prior Publication Data

US 2023/0279821 A1 Sep. 7, 2023

(30) Foreign Application Priority Data

Jul. 20, 2020 (FR) ...................................... 2007581

(51) Int. Cl.
*F02D 41/20* (2006.01)
*F02D 41/24* (2006.01)
(Continued)

(52) U.S. Cl.
CPC ..... *F02D 41/2096* (2013.01); *F02D 41/2467* (2013.01); *F02M 47/027* (2013.01);
(Continued)

(58) Field of Classification Search
CPC ........ F02D 41/02; F02D 41/027; F02D 41/24; F02D 41/2467; F02M 47/02;
(Continued)

(56) References Cited

U.S. PATENT DOCUMENTS 5,941,216 A * 8/1999 Arakawa .............. F02M 51/061 123/490
6,499,464 B2 12/2002 Rueger
(Continued)

FOREIGN PATENT DOCUMENTS

DE 10 2015 205 877 10/2016
FR 2 811 016 1/2002
(Continued)

OTHER PUBLICATIONS

International Search Report and Written Opinion of the ISA dated Sep. 28, 2021, for PCT/EP2021/068254, 15 pp.

*Primary Examiner* — John Kwon
*Assistant Examiner* — Johnny H Hoang
(74) *Attorney, Agent, or Firm* — NIXON & VANDERHYE

(57) ABSTRACT

Disclosed is a method for determining a static flow rate of a piezo-electric injector of an injection system. The piezo-electric injector includes a needle and a piezo-electric actuator designed to control a valve of the injector. The injection system includes an electric generator designed to send electric current pulses to the piezo-electric actuator of the injector, and a voltage sensor designed to measure voltage values at the terminals of the piezo-electric actuator. The method includes the following steps: sending during a phase of closure of the needle of an electric current pulse such that the piezo-electric actuator is positioned in contact with the valve, without giving rise to the opening thereof; measurement of a plurality of voltage values of the piezo-electric actuator; and determining a static flow rate of the piezo-
(Continued)

electric injector on the basis of a plurality of voltage values measured of the piezo-electric actuator.

17 Claims, 4 Drawing Sheets

(51) Int. Cl.
*F02M 47/02* (2006.01)
*F02M 63/00* (2006.01)
*F02M 65/00* (2006.01)

(52) U.S. Cl.
CPC ...... *F02M 63/0026* (2013.01); *F02M 65/001* (2013.01); *F02M 65/005* (2013.01); *F02D 2041/2051* (2013.01)

(58) Field of Classification Search
CPC .. F02M 47/027; F02M 63/00; F02M 63/0026; F02M 65/00; F02M 65/001; F02M 65/005
See application file for complete search history.

(56) References Cited

U.S. PATENT DOCUMENTS

| | | | | |
|---|---|---|---|---|
| 6,713,021 | B1 * | 3/2004 | Shvets | B01L 3/0265 251/129.08 |
| 6,863,055 | B2 * | 3/2005 | Rueger | F02D 41/2096 123/478 |
| 8,096,485 | B2 * | 1/2012 | Hlousek | F02M 53/04 239/585.1 |
| 8,543,314 | B2 * | 9/2013 | Nakata | F02M 63/0225 123/456 |
| 8,681,468 | B2 * | 3/2014 | Jacob | H01F 7/1844 361/154 |
| 9,828,956 | B2 | 11/2017 | Leblon et al. | |
| 10,378,474 | B2 | 8/2019 | Hirchenhein et al. | |
| 10,393,056 | B2 * | 8/2019 | Pursifull | F02D 41/3854 |
| 10,578,043 | B2 | 3/2020 | Hirchenhein et al. | |
| 2010/0095936 | A1 * | 4/2010 | Schempp | F02D 41/2096 123/478 |
| 2010/0288238 | A1 * | 11/2010 | Beilharz | F02D 41/2096 123/480 |
| 2014/0007665 | A1 * | 1/2014 | Katzenberger | F02D 41/2096 73/114.48 |
| 2014/0069389 | A1 * | 3/2014 | Nishimura | F02D 41/30 123/478 |
| 2015/0108923 | A1 * | 4/2015 | Leblon | F02D 41/402 318/116 |
| 2016/0281624 | A1 * | 9/2016 | Dames | F02D 41/20 |
| 2020/0088122 | A1 * | 3/2020 | Kusakabe | F02D 41/40 |

FOREIGN PATENT DOCUMENTS

| | | |
|---|---|---|
| FR | 2 907 544 | 4/2008 |
| FR | 3 039 221 | 1/2017 |
| FR | 3 083 268 | 1/2020 |
| WO | 2016/155986 | 10/2016 |
| WO | 2017/021091 | 2/2017 |

* cited by examiner

METHOD, PROGRAM PRODUCT AND COMPUTER FOR ESTIMATING THE STATIC FLOW RATE OF A PIEZOELECTRIC INJECTOR

CROSS-REFERENCE TO RELATED APPLICATIONS

This application is the U.S. national phase of International Application No. PCT/EP2021/068254 filed Jul. 1, 2021, which designated the U.S. and claims priority to FR 2007581 filed Jul. 20, 2020, the entire contents of each of which are hereby incorporated by reference.

TECHNICAL FIELD

The present invention concerns a method for controlling an engine, and more specifically a method for controlling injectors in a combustion engine. The present invention applies more particularly to the motor vehicle industry.

PRIOR ART

Traditionally, an injection engine comprises injectors provided with injection orifices, and a rail to supply the injectors with fuel. These injectors are designed to inject fuel into the combustion chambers via said orifices, the fuel being subjected to a determined pressure in the rail by means of a high-pressure pump. In each injector, a needle is used to carry out the opening and closure of the injection orifices which are at an end of the injector, which end is designed to be located in a combustion chamber, said end sometimes being known as the "nose" of the injector.

As a result of their use, injectors are subject to phenomena of corrosion and dirtying which make their static flow rate vary.

"Static flow rate of the injector" means in this case a flow rate of fuel supplied at a determined pressure by the injector into the combustion chamber, after opening by its needle which is sufficiently lengthy for establishment of a substantially constant instantaneous flow rate of fuel supplied. [FIG. 1] represents three instantaneous flow rate curves of injectors on the y-axis d during a cycle of opening and closure of their respective needle during the time on the x-axis t. On each of these curves it can be seen that there is a plateau present formed at the top of the instantaneous flow rate curve, corresponding to a substantially constant flow rate value, thus representing the static flow rate of the injector.

A curve $P_1$ is represented in [FIG. 1], and corresponds to the response of an injector corroded during the cycle of opening and closure of its needle. It can be seen that the corroded injector, characterized in that that its orifices are widened in comparison with their original diameter at the production line output, gives rise to an increase in the static flow rate of said injector. In this case, corrosion gives rise to a decrease in the loss of load at the nose of the injector during the injection of fuel. The loss of load constitutes the pressure difference which exists between the pressure of the fuel contained in the chamber of the nose of the injector, and the pressure at the output of said nose. The decrease in the loss of load gives rise to opening of the needle of the corroded injector which is slower than that of a nominal injector (represented by the curve $P_0$ in [FIG. 1]) which has not been subjected to a decrease of loss of load. The closure of the needle is also faster than that of the nominal injector, since, as the needle has been opened more slowly, it has been raised less high than the needle of the nominal injector, and therefore closes faster than it. In addition, the pressure at the base of the needle of the corroded injector is lower than that of a nominal injector, because of the lower loss of load at injection, and thus the resistance to its closure is lower than that of the nominal injector, and the needle is therefore re-closed at a higher speed. An increase in the static flow rate of the injector gives rise to a detrimental increase in the quantity of fuel injected during a needle opening and closure cycle, and, by extension, to an increase in the emission of pollutant gases, and to drifts of torque of the engine.

On the other hand, a dirty injector represented by the curve $P_2$ in [FIG. 1], the orifices of which are partly blocked by material, gives rise to a decrease in the static flow rate of the injector. In this case, with dirt giving rise to an increase in the loss of load associated with the nose of the injector, the opening of the needle of the dirty injector is faster than that of the nominal injector. The closure of the needle is also slower than that of the nominal injector. In fact, since the needle has opened faster, it has been raised higher than that of the nominal injector, and the increase in the loss of load means that the resistance to closure of the needle of the injector is stronger than that of the nominal injector, and the needle thus closes more slowly. Inter alia, a decrease in the static flow rate of the injector gives rise to drifts of engine torque.

It is thus understood that knowing the static flow rate of an injector makes it possible to regulate the aforementioned negative effects at least partly. For example, knowing the static flow rate of an injector makes it possible to generate an alert in the event of major divergence from a nominal static flow rate value, to correct the pressure in the supply rail, or also to correct an injection electrical command.

A plurality of known methods make it possible to estimate the static flow rate of an injector.

Some of these are based on the low pressure observed in the fuel supply rail during an injection of fuel, in the analysis of a crankshaft sensor or in the analysis of the richness sensor. However, these methods pose problems of precision of the estimation of the static flow rate, and depend on parameters which are not associated with the injector, such as pressure disturbances in the rail for the methods which are based on the low pressure, or also the performance of the engine, with the dependence on the transmission chain and the admission pressure for the methods being based on data from the crankshaft sensor or from the richness sensor.

Others use additional sensors, for example a pressure sensor in the control chamber of a servo-drive injector, an optical sensor, a sensor via electrical contact between the needle and the nose of the injector, or also a cylindrical pressure sensor in the combustion chamber. Adding additional sensors makes the system more complex and more costly. In fact, as well as the intrinsic price of the sensor, account must also be taken of its reliability, and its failure mode must be controlled.

There are also solutions based on the relationship between an instant of predetermined closure of the needle of the injector, and a drift of the static flow rate. However, the actual closure of the needle is dependent on a plurality of other effects, such as the dependence of the pressure waves obtained from the preceding injections on multiple injections, or, in the case of a piezo-electric injector, on the control of opening of the valve controlled by the piezoelectric actuator. These solutions are thus difficult to implement, and lack precision.

The present application therefore seeks to resolve the problems posed by the methods according to the prior art.

SUMMARY OF THE INVENTION

A first objective of the present application is thus to propose a method for estimating a static flow rate of a piezo-electric injector in a combustion engine.

A second objective consists of implementing this method on the injection system without modifying it, and in particular without adding supplementary sensors.

A third objective of the present invention is to make estimation of the static flow rate robust in relation to the multiple injections and to the control of the opening of the piezo-electric injector valve.

A fourth objective of the invention consists of generating an alert when the static flow rate determined of a piezo-electric injector is greater than a predetermined threshold.

Finally, a fifth objective consists of correcting a quantity of fuel injected by the injector according to the static flow rate determined.

In this respect, the invention proposes a method for determining a static flow rate of a piezo-electric injector of a combustion engine injection system, the piezo-electric injector comprising a needle and a piezo-electric actuator which is designed to control a valve of the injector, the injection system comprising an electric generator which is designed to send electric current pulses to the piezo-electric actuator of the injector, and a voltage sensor which is designed to measure voltage values at the terminals of the piezo-electric actuator, said method being characterized in that it comprises the following steps:

- sending by the electric generator of an electric current pulse to the piezo-electric actuator, such that the piezo-electric actuator is positioned in contact with the valve, without giving rise to the opening thereof, the sending being carried out during a phase of closure of the needle;
- measurement by the voltage sensor of a plurality of voltage values of the piezo-electric actuator; and
- determining a static flow rate of the piezo-electric injector on the basis of the plurality of voltage values measured of the piezo-electric actuator.

According to one alternative, the step of determining the static flow rate comprises a first sub-step of calculation of a voltage variation dV between an instant $t_c$ where the piezo-electric actuator is in contact with the valve after the electric current pulse has been sent, and an instant $t_{end}$ after an instant $t_3$ of closure of the needle.

In this alternative, the step of determining the static flow rate can also comprise a second sub-step of calculation of a pressure variation $dP_{cc}$ in a control chamber of the injector, starting from the voltage variation dV at the terminals of the electric actuator.

In this alternative, the step of determining the static flow rate can also comprise a third sub-step of determining the static flow rate of the injector, starting from the voltage variation dV and a table of static flow rate reference values of a piezo-electric injector.

According to one alternative, the method is implemented only when:

- a determined duration between an instant $t_2$ of closure of the valve and an instant $t_3$ of closure of the needle is greater than a predetermined threshold; and
- the temperature of the engine is between a first predetermined temperature and a second predetermined temperature; and
- the engine speed is between a first predetermined speed of rotation and a second predetermined speed of rotation.

According to one alternative, when an absolute value of a difference between the determined static flow rate of the injector and a nominal static flow rate of an injector is greater than a predetermined threshold, the method comprises a supplementary step of generation of an alert.

According to one alternative, the injection system also comprises a fuel supply rail, and a pressure of the fuel in the fuel supply rail is controlled according to the static flow rate of the injector.

The invention also comprises a computer program product comprising encoding instructions for implementation of the steps of a method described above.

The invention also proposes a computer which is designed to control a combustion engine injection system comprising a piezo-electric injector, the injector comprising a needle and a piezo-electric actuator designed to control a valve of the injector, the injection system also comprising an electric generator which is designed to send electric current pulses to the piezo-electric actuator of the injector, a voltage sensor which is designed to measure voltage values at the terminals of the piezo-electric actuator, and a fuel supply rail, the computer also being designed to control implementation of the steps of a method described above.

The computer can also be incorporated in a combustion engine with an injection system as presented above.

The method presented according to the invention thus makes it possible to estimate a static flow rate of a piezo-electric injector in a combustion engine on the basis of voltage values at the terminals of the piezo-electric actuator. This method can thus be implemented without modifying the existing injection system of the engine, and thus without making it more complex, for example with the addition of supplementary sensors. Since the method is not based on a predetermined instant of closure of the needle, it is free from the effects modifying the temporality of closure of the needle which are not due to the static flow rate, and in particular the effects associated with the multiple injection, with the control of opening of the valve of the piezo-electric injector, or also with the ageing of the injector. The method thus makes it possible to trigger an alert when the static flow rate of the injector is greater than a predetermined threshold, or to control the quantity of fuel injected into the combustion chamber of the engine, by controlling the pressure of said fuel in the supply rail.

BRIEF DESCRIPTION OF THE DRAWINGS

Other characteristics, details and advantages will become apparent from reading the following detailed description and from analyzing the appended drawings, in which.

The diagram at the top represents both a voltage at the terminals of the piezo-electric actuator and opening of the valve controlled by this actuator during the cycle.

The diagram in the middle represents a pressure in a control chamber of the injector during the cycle.

The diagram at the bottom represents a course of the needle during the cycle.

Figure 3:
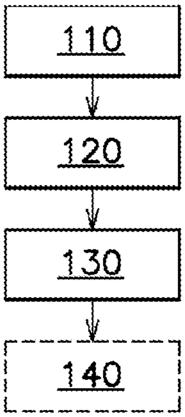
FIG. 3 represents an embodiment of a method for determining the static flow rate of a piezo-electric injector.
Figure 6:
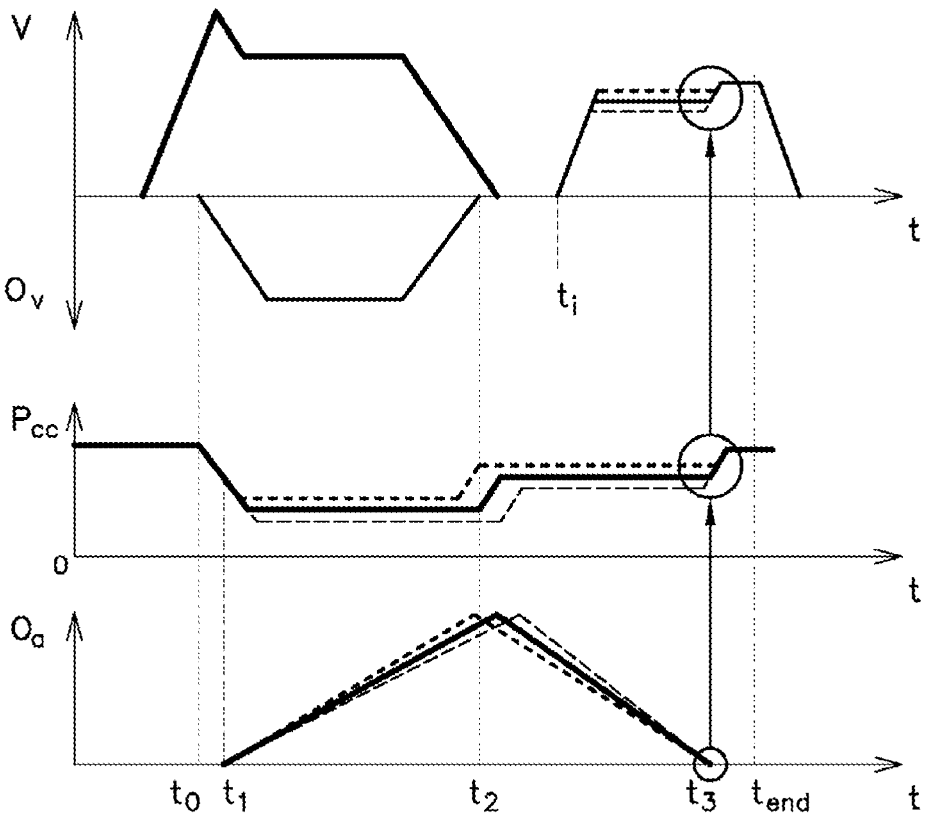

FIG. 6 also represents three diagrams relating to elements of the piezo-electric injectors during a cycle of opening and closure of its needle, and incorporating the method presented in [FIG. 3].

The diagram at the top represents both a voltage at the terminals of the piezo-electric actuator and opening of the valve controlled by this actuator during the cycle.

The diagram in the middle represents a pressure in a control chamber of the injector during the cycle.

The diagram at the bottom represents opening of the needle during the cycle.

Figure 7:
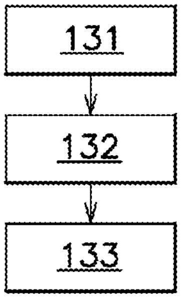

FIG. 7 represents an embodiment of a step of determining the static flow rate on the basis of a plurality of voltage values measured at the terminals of the piezo-electric actuator.

DESCRIPTION OF THE EMBODIMENTS

Figure 1:
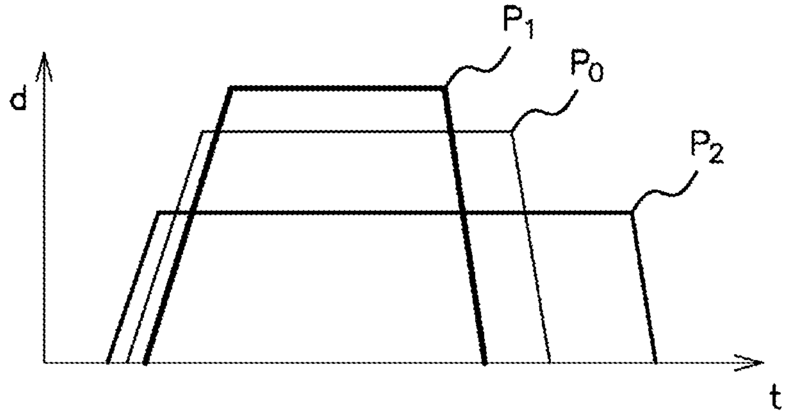
FIG. 1 represents three instantaneous flow rate curves of injectors during a cycle of opening and closure of their respective needle.
Figure 2:
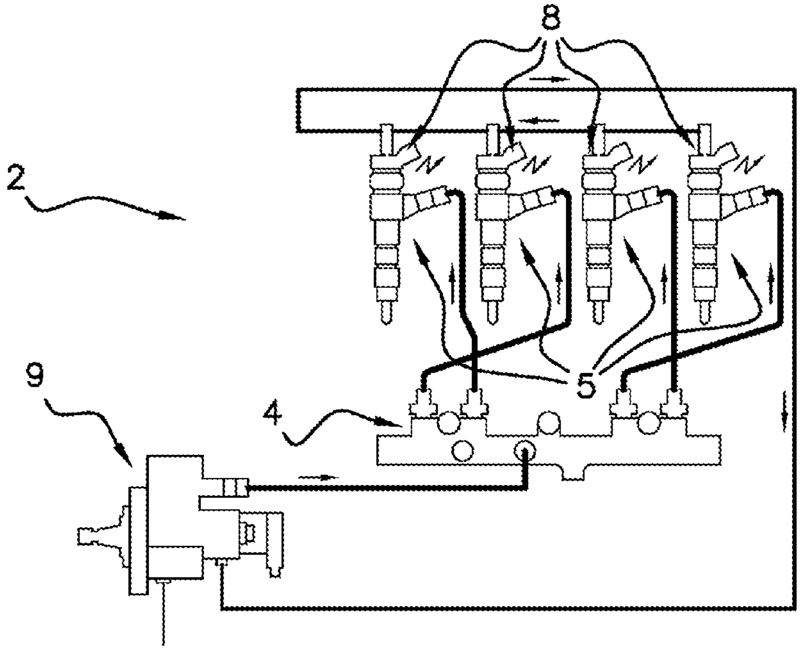
FIG. 2 represents an embodiment of an injection system for implementation of a method for determining a static flow rate of a piezo-electric injector.

Reference is now made to [FIG. 2] which presents an embodiment of an injection system 2 for a combustion engine, for example a motor vehicle engine. This injection system 2 permits implementation of a method for determining a static flow rate of a piezo-electric injector represented in [FIG. 3].

The injection system 2 comprises a fuel supply rail 4 which is connected to a fuel tank (not represented) by means of a supply line. In addition, the fuel tank is also connected to a plurality of piezo-electric injectors 5 by return lines. The fuel which is present in the supply rail 4 is supplied by a high-pressure pump 9 at a determined pressure in order to assist good combustion of the fuel during the different injection phases. As a result, it follows a set pressure determined by an engine computer (not represented) which controls the high-pressure pump 9. The engine computer can for example be a processor, a microprocessor or a microcontroller. It can also have a memory comprising encoding instructions in order to control the implementation of the steps of the method for determining a static flow rate of a piezo-electric injector represented in [FIG. 3]. The injection system 2 also comprises an electric generator 8.

Figure 4A:
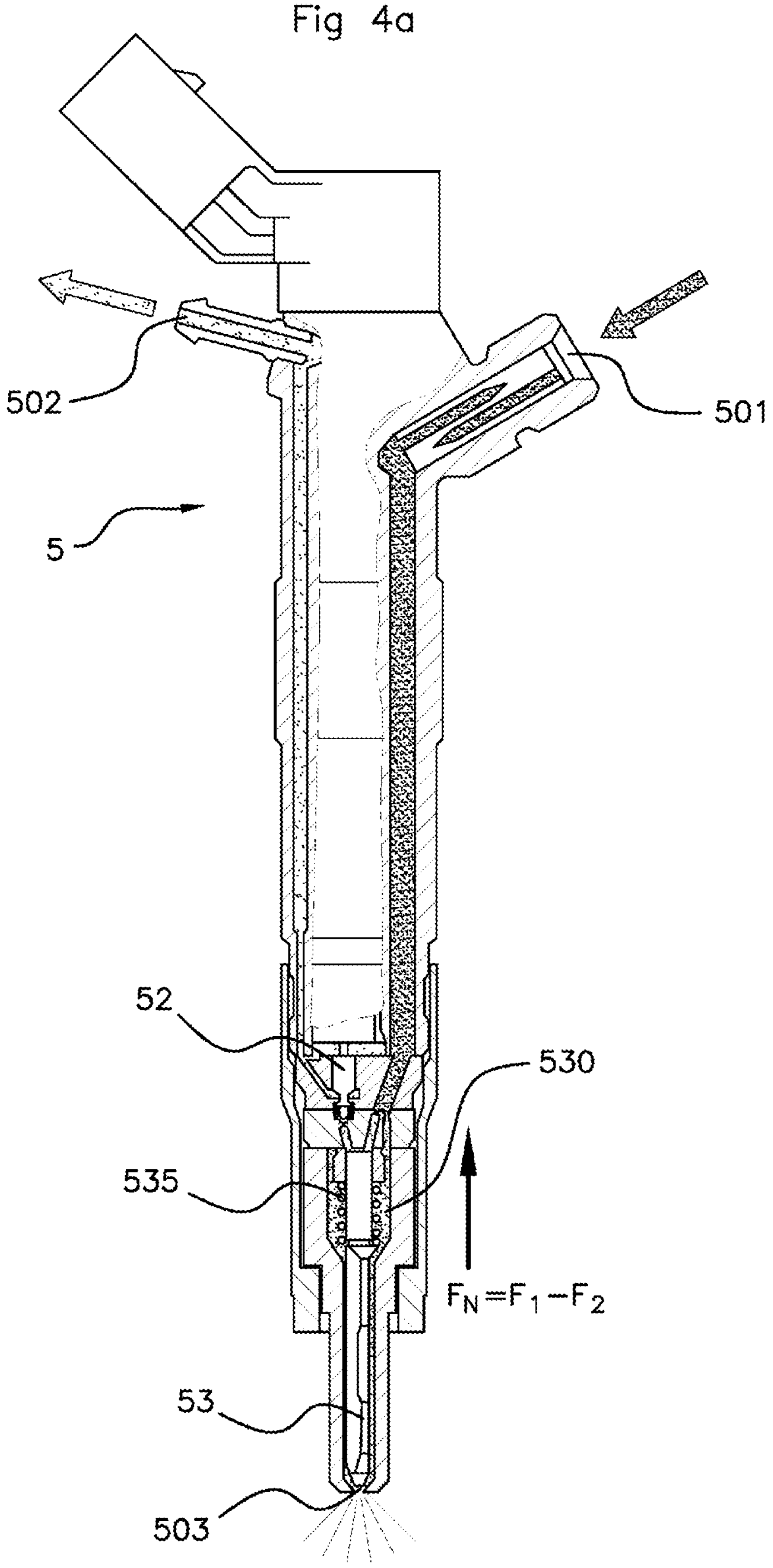
FIG. 4*a* represents a piezo-electric injector during an injection phase.
Figure 4B:
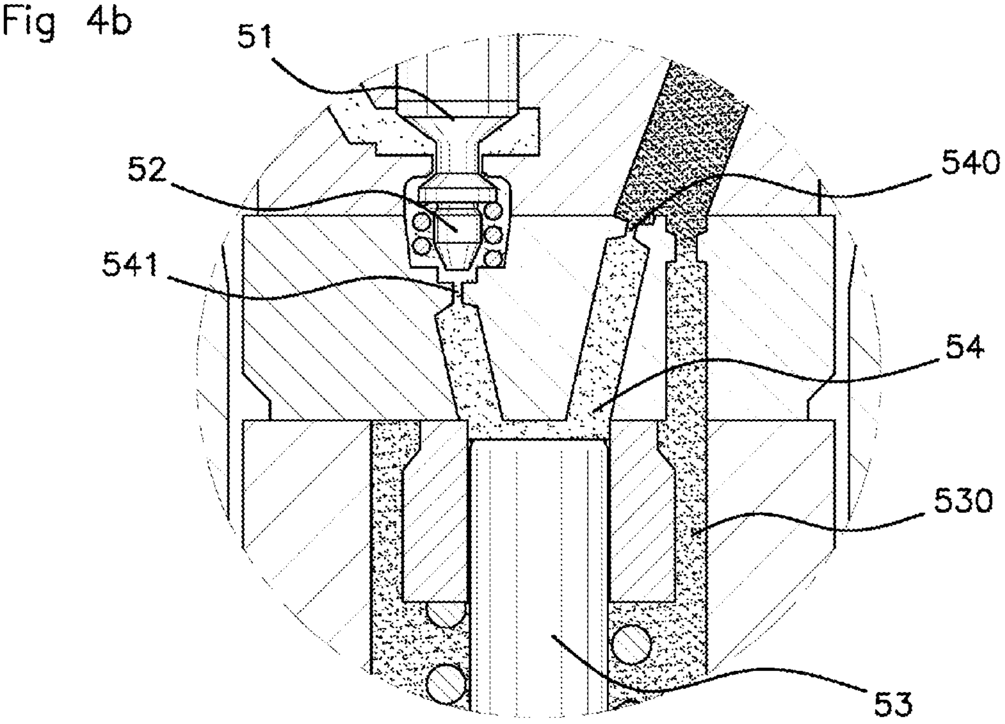
FIG. 4*b* represents an enlarged view of a valve, of a piezo-electric actuator, and of a control chamber of the piezo-electric injector of FIG. 4*a*.

A piezo-electric injector 5 of the injection system 2 is more specifically represented in FIGS. 4*a* and 4*b*. It comprises a high-pressure fuel input 501, a low pressure fuel output 502 going towards the return line of the injector 5 and thus towards the tank, and a nose comprising a plurality of orifices 503 for injection of fuel into a combustion chamber (not represented) of the engine. The injector also comprises a needle 53, which is movable in a chamber of the nose of the injector 530 in fluid communication with the high-pressure fuel input 501, the needle 53 being movable between a first position, in which it closes the fuel injection orifices 503, and a second position, in which it opens up these orifices (position represented in FIGS. 4*a* and 4*b*), thus permitting the injection of fuel into the combustion chamber. The needle 53 is retained in the closed position by a return spring 535.

The injector 5 also comprises a control chamber 54 (see FIG. 4*b*) positioned at the end of the needle 53 opposite the nose of the injector. The control chamber 54 is in fluid communication with the high-pressure fuel input 501 via a narrowing 540, and in fluid communication with the low-pressure fuel output 502 towards the tank via a second narrowing 541 and a valve 52 which is positioned between the output 502 and the second narrowing 541.

In this case, it is the difference between a pressure $P_{cc}$ in the control chamber 54, and a pressure $P_a$ in the chamber of the nose of the injector 530 which makes it possible to open or close the needle 53 of the injector. When the needle 53 and the valve 52 of the injector 5 are closed, the pressure $P_{cc}$ in the control chamber 54 is equal to the pressure of the fuel in the fuel supply rail 4. In this respect, the difference between the pressures $P_{cc}$ and $P_a$ is zero, and it is therefore the addition of the force derived from the difference in cross-section on which the pressures $P_{cc}$ and $P_a$ are exerted, the force exerted by the return spring 535, and the weight of the needle, which keep the needle 53 of the injector closed.

The injector also comprises a piezo-electric actuator 51, which, when it receives a first electric pulse from the electric generator 8 of the injection system 2, is charged and elongated by the piezo-electric effect, such as to be supported on the valve 52. As represented in FIGS. 4*a* and 4*b*, the support on the valve 52 at a sufficient force makes it possible to permit circulation of fluid from the high-pressure fuel circuit of the injector to the low-pressure output 502. This gives rise to a decrease in the pressure $P_{cc}$ in the control chamber 54, and thus to displacement of the needle 53 upwards under the effect of the high-pressure $P_a$ which remains in the chamber of the nose of the injector 530, such as to open the injection orifices 503. Thus, the fuel can move from the supply rail 4 towards the combustion chamber via the injection orifices 503, and thus trigger injection into said combustion chamber. The objective is thus to open the needle 53 by charging the piezo-electric actuator 51 of the piezo-electric injector.

In order to close the needle 53, and thus interrupt the injection phase, the electric generator 8 sends a second electric pulse to the piezo-electric actuator 51 of the injector 5, such as to discharge it. As it discharges, the piezo-electric actuator 51 retracts, and is thus no longer supported on the valve 52 with sufficient force for the valve to remain open. Thus, the valve 52 closes, the balance of the pressures $P_{cc}$ in the control chamber 54 and $P_a$ in the chamber of the nose of the injector 530 is inverted, and the needle 53 re-closes.

However, the closure of the needle is not immediate, and there is therefore a certain period of inertia of the needle 53, between an instant $t_2$ of closure of the valve 52, and an instant $t_3$ of closure of the needle 53.

Figure 5:
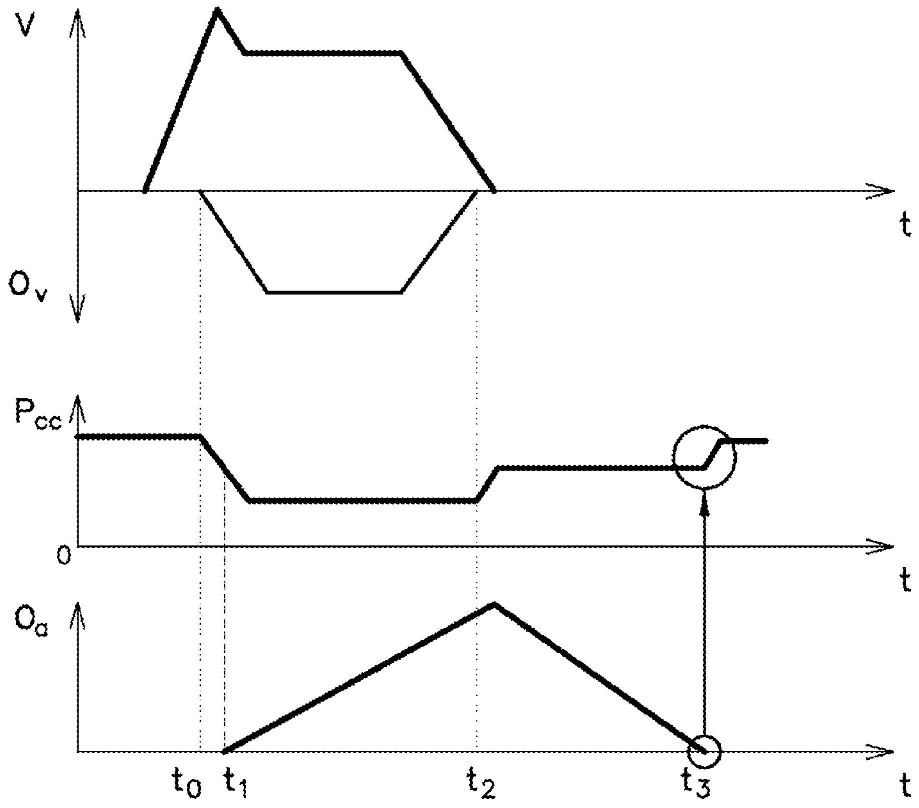
FIG. 5 represents three diagrams relating to elements of the piezo-electric injector during a cycle of opening and closure of its needle.

A cycle of opening and closure of the needle 53 of a piezo-electric injector 5 is represented during an injection cycle which makes the different elements of the piezo-electric injector 5 intervene, and illustrating the instants previously defined in [FIG. 5].

The top diagram thus represents a voltage V at the terminals of the piezo-electric actuator 51 of the injector, and an opening $O_v$ of the valve 52 of the injector 5 according to the time t. The middle diagram also represents the pressure $P_{cc}$ in the control chamber 54 according to the time t. Finally, the bottom diagram represents the opening $O_a$ of the needle 53 of the piezo-electric injector 5 according to the time. It will be appreciated that the temporal references are the same in the three diagrams.

When the valve 52 opens at an instant $t_0$, a decrease in the pressure $P_{cc}$ in the control chamber 54 is observed, since the chamber is put into fluid communication with the low-pressure output 502 of the injector 5. This results in the start of opening of the needle 53 at an instant $t_1$ when the resulting force of the pressure $P_a$ on a section of the base of the needle 53 becomes greater than the addition of the forces exerted at the top of the needle 53, i.e. the addition of the force resulting from the pressure $P_{cc}$ being exerted on a section of the top of the needle, the force exerted by the return spring 535 and the force exerted as a result of the weight of the needle 53.

On the other hand, when the valve closes at the instant $t_2$, an increase is observed in the pressure $P_{cc}$ in the control chamber 54, since the chamber no longer communicates with the low-pressure output 502 of the injector 5. The pressure level in the control chamber 54 is established at an intermediate value between the pressure when the valve 52 was open, and the pressure in the fuel supply rail 4, since, at this stage, the needle 53 is still open. This results in the start of closure of the needle 53, since the resultant of the forces being exerted in a closure direction (force exerted by the return spring 535, pressure $P_{cc}$ being exerted on the section of the top of the needle 53 in the control chamber 54, and gravitation force on the needle 53) becomes greater than the force resulting from the pressure $P_a$ on the section of the base of the needle 53 in the chamber of the nose of the injector 530.

The objective in this case is to present the conventional operation of a piezo-electric injector, in order to be able to describe the method for determining a static flow rate of a piezo-electric injector.

With reference to [FIG. 3], below an embodiment of the method for determining a static flow rate of a piezo-electric injector is presented. Reference will also be made to [FIG. 6] during the description of the method.

The method comprises a first step 110 of sending by the electric generator 8 of an electric current pulse to the piezo-electric actuator 51, such that the piezo-electric actuator 51 is positioned in contact with the valve 52 without giving rise to opening thereof. This step is carried out when the needle 53 of the piezo-electric injector 5 re-closes during an injection phase More specifically, the step is carried out at an instant $t_1$ position in time between the instant $t_2$ of closure of the valve 52, and the instant $t_3$ of closure of the needle 53 during the injection phase. In this case, this step is carried out when the needle 53 of the piezo-electric injector re-closes, and the objective is thus to position the piezo-electric actuator 51 in contact with the valve 52, without however re-opening it. Opening of the valve 52 could lead to raising of the needle 53 by a new inversion of the pressures $P_{cc}$ and $P_a$ in the chambers, which would modify the operation of the injector.

The objective in the continuation of the method is to use the piezo-electric actuator 51 as a pressure variation sensor in the control chamber 54.

The method thus comprises a second step 120 of measurement by the voltage sensor (not represented) of a plurality of voltage values of the piezo-electric actuator 51. The plurality of voltage values can be measured continuously throughout the phase of injection of the piezo-electric injector 5, the static flow rate of which is to be estimated. Advantageously, the measurements of the voltage values of the plurality of voltage values can be carried out between the instant $t_i$ during which the electric current pulse is sent by the generator 8, and an instant $t_{end}$ after the instant $t_3$ of closure of the needle 53 which is sufficiently far off to permit establishment of a stabilized pressure $P_{cc}$ in the control chamber 54 of the injector 5.

The method then comprises a third stage 130 of determining a static flow rate of the piezo-electric injector 5, on the basis of the plurality of voltage values measured of the piezo-electric actuator 51.

As represented in [FIG. 6], when the needle 53 of the injector 5 re-closes at the instant $t_3$, the pressure $P_{cc}$ in the control chamber 54 increases since the fuel circuit coming from the supply rail 4 and going via the piezo-electric injector 5 becomes sealed once more, and thus once more becomes subject to the fuel pressure of the supply rail 4 provided by the high-pressure pump 9. As a result, the force which is exerted on the closed valve 52 increases, and when the piezo-electric actuator 51 is in contact with the valve 52, the voltage V of the actuator 51 thus increases in response to this pressure increase $P_{cc}$ in the control chamber 54. These phenomena are identified by circles in [FIG. 6].

In addition, in FIG. 6, three different piezo-electric injector responses are represented. The curves corresponding to a nominal injector are represented in a thick continuous line on each of the diagrams. The curves corresponding to a corroded injector are represented by broken lines on each of the diagrams, when the operation of the corroded injector differs from the operation of the nominal injector. The curves corresponding to a dirty injector are represented by dotted lines on each of the diagrams, when the operation of the dirty injector differs from the operation of the nominal injector.

FIG. 6 shows that there is a direct correlation between a variation dV of the voltage V at the terminals of the piezo-electric actuator 51, and a variation $dP_{cc}$ of the pressure $P_{cc}$ in the control chamber 54, when the needle 53 of the injector closes. In addition, it is known that there is also a correlation between a pressure variation $dP_{cc}$ in the control chamber 54 caused by the closure of the needle 53, and the static flow rate of the injector 5, taking into account the fact that, between the instants $t_2$ and $t_3$, the fuel flows only by means of the injection orifices 503, and that, after the instant $t_3$, the system is sealed once more.

In this case, the greater the pressure variation $dP_{cc}$ in the control chamber 54 when the needle 53 closes, the greater the static flow rate of the piezo-electric injector 5 is. In fact, when the static flow rate of the injector is great and the needle 53 is open, the pressure difference (or difference of load) between the pressure accumulating at the nose of the injector 5, and in particular at the orifices 503 of the injector 5, and the pressure of the fuel expelled into the combustion chamber through said orifices, is low. This means that, before being expelled into the combustion chamber, the fuel does not accumulate significantly at the orifices 503, but exits from the nose of the injector 5 easily. This means in reality that the section of passage of fuel of the orifices 503 is large, so that the fuel does not accumulate at said orifices without being able to be expelled. In particular, this is the case of a corroded injector, the section of passage of which at the orifices 503 is larger than that of a nominal injector because of the corrosion.

As a result, as represented in [FIG. 6], when the needle 53 of the corroded injector opens at the instant $t_1$, the decrease of pressure $P_{cc}$ in the control chamber 54 is greater than that of the nominal injector, since it is correlated with the decrease in pressure at the nose of the injector, as a result of the fluid communication which exists between the control chamber 54 and the nose of the injector. However, after the needle 53 opens, the accumulation of the fuel at the nose of the corroded injector is less great than the accumulation of fuel at the nose of the nominal injector, since the section of passage of the orifices of the corroded injector is larger than the section of passage of the orifices of a nominal injector. This means that the pressure at the nose of the corroded injector is less great than the pressure at the nose of the nominal injector after the needle has opened, since the fuel passes more easily from the nose to the combustion chamber. The decrease in pressure generated by the opening of the needle is thus greater in the nose of the corroded injector than in the nose of the nominal injector. It is thus understood that, when the needle 53 closes at the instant $t_3$, the pressure variation $dP_{cc}$ in the control chamber 54, when the chamber returns to the fuel pressure level of the supply rail 4, is greater for the corroded injector than for the nominal injector.

As far as the dirty injector is concerned, the inverse reasoning applies. Thus, the section of passage of the orifices 503 of the dirty injector is less great than that of a nominal injector because of the dirt.

As a result, as represented in [FIG. 6], when the needle 53 of the dirty injector opens at the instant $t_1$, the decrease in pressure $P_{cc}$ in the control chamber 54 is lower than that of the nominal injector, since it is correlated with the decrease in pressure at the nose of the injector, because of the fluid communication which exists between the control chamber 54 and the nose of the injector. However, the pressure at the nose of the dirty injector decreases less than the pressure at the nose of the nominal injector when the needle 53 opens. In fact, since the section of passage of the orifices of the dirty injector is smaller than the section of passage of the orifices of a nominal injector, the accumulation of fuel at the nose of the dirty injector is greater than the accumulation of fuel at the nose of the nominal injector. This therefore means that the pressure at the nose of the dirty injector is greater than the pressure at the nose of the nominal injector. The decrease in pressure generated by the opening of the needle is thus less great in the nose of the dirty injector than in the nose of the nominal injector. It is thus understood that, when the needle 53 closes at the instant $t_3$, the pressure variation $dP_{cc}$ in the control chamber 54, when the chamber returns to the fuel pressure level of the supply rail 4, is less great for the dirty injector than for the nominal injector.

Thus, when the plurality of voltage values has been measured at the terminals of the piezo-electric actuator 51 of the injector, with the voltage variation dV being representative of the pressure variation $dP_{cc}$ of the control chamber 54, it is possible to determine the static flow rate of the piezo-electric injector 5.

With reference now to [FIG. 7], an embodiment of the step 130 of determination of the static flow rate of a piezo-electric injector 5 is now described.

The step 130 of determination can thus comprise a first sub-step 131 of calculation of a voltage variation dV between an instant $t_c$ where the piezo-electric actuator 51 is in contact with the valve 52 after sending 110 of the electric current pulse, and the instant $t_{end}$ after the instant $t_3$ of closure of the needle 53. This step is implemented on the basis of the plurality of voltage values measured at the terminals of the piezo-electric actuator 51 of the piezo-electric injector 5. As previously explained, this voltage variation dV is representative of the pressure variation $dP_{cc}$ in the control chamber 54, by means of which it is possible to determine the static flow rate of the piezo-electric injector 5.

Optionally, in this embodiment, a second sub-step 132 of calculation of a pressure variation $dP_{cc}$ in the control chamber 54 of the injector 5 can be implemented. The calculation is carried out on the basis of the voltage variation dV determined when the first sub-step 131 is completed. In fact, the voltage variation dV of the piezo-electric actuator 51 corresponds to a force applied on said actuator as a result of the piezo-electric effect. Thus, when the surface area of the piezo-electric actuator 51 is known, as well as the force exerted on it by the support of the valve 52 as a result of the pressure in the control chamber 54, it is possible to calculate the pressure variation $dP_{cc}$ in the control chamber 54 of the piezo-electric injector 5. This therefore gives the pressure variation $dP_{cc}$ in the control chamber 54 after closure of the needle 53.

Finally, a third sub-step 133 of determining the static flow rate of the injector 5 is implemented on the basis of the voltage variation dV and a table of static flow rate reference values of an injector.

Thus, in the embodiment where the second sub-step 132 is not implemented, the reference table makes the voltage variation dV correspond directly with a static flow rate of a piezo-electric injector.

In the embodiment where the second sub-step 132 is implemented, the reference table makes the pressure variation $dP_{cc}$ in the control chamber 54 of the piezo-electric injector 5 correspond with a static flow rate of a piezo-electric injector.

Whether it is directly by the voltage variation dV of the electric actuator 51, or by the use of this voltage variation dV in order to deduce the pressure variation $dP_{cc}$ in the control chamber 54, it is thus possible to obtain the static flow rate of the piezo-electric injector 5.

Going back to the method presented in [FIG. 3], upon completion of the step 130 of determining the static flow rate of the injector 5, the method can comprise a supplementary step 140 of generation of an alert when an absolute value of a difference between the determined static flow rate of the injector 5 and a nominal static flow rate of an injector is greater than a predetermined threshold.

In addition, the method can also comprise control of the fuel pressure in the fuel supply rail 4 according to the static flow rate determined upon completion of the step 130 of determination, in order to regulate the quantity of fuel injected into the combustion chamber.

Advantageously, the method is implemented only when the following three conditions are fulfilled:

- when a determined duration between the instant $t_2$ of closure of the valve 52 and the instant $t_3$ of closure of the needle is greater than a predetermined threshold; and
- when the temperature of the engine is between a first predetermined temperature and a second predetermined temperature; and
- when the engine speed is between a first predetermined speed of rotation and a second predetermined speed of rotation.

The last two conditions make it possible to ensure that the injection system 2 is functioning sufficiently stably to be able to implement the method with good precision and good repeatability.

The method presented above thus makes it possible to estimate a static flow rate of a piezo-electric injector in a combustion engine. This estimation is based on voltage values at the terminals of the piezo-electric actuator of the injector positioned in contact with the valve. It can therefore be implemented without modifying the existing injection system and in particular without making it more complex. Since the method is not based on determining a predetermined instant of closure of the needle, it is free from effects which modify the temporality of closure of the needle which are not caused by the static flow rate, and in particular the effects associated with the multiple injection or with the control of the opening of the valve of the piezo-electric injector. Finally, when the static flow rate of the piezo-electric injector is determined, it is possible to trigger an alert or to control the quantity of fuel injected into the combustion chamber of the engine by controlling the pressure of said fuel in the supply rail.

The invention claimed is:

1. A method for determining a static flow rate of a piezo-electric injector of a combustion engine injection system, the piezo-electric injector comprised of a needle and a piezo-electric actuator that controls a valve of the injector, the injection system also including an electric generator that sends electric current pulses to the piezo-electric actuator of the injector, and a voltage sensor that measures voltage values at terminals of the piezo-electric actuator, said method comprising the steps of:

sending, via the electric generator, an electric current pulse to the piezo-electric actuator, such that the piezo-electric actuator contacts the valve without opening the valve, the electric generator sending the electric current pulse during a time of an injection cycle of the injector when the needle is returning from an open position to a closed position;

measuring, via the voltage sensor, a plurality of voltage values of the piezo-electric actuator; and determining the static flow rate of the piezo-electric injector based on the plurality of voltage values measured of the piezo-electric actuator.

2. The method as claimed in claim 1, wherein the step of determining the static flow rate comprises a first sub-step of calculating a voltage variation between an instant where the piezo-electric actuator is in contact with the valve after the electric current pulse has been sent, and an instant after an instant of closure of the needle.

3. The method as claimed in claim 2, wherein the step of determining the static flow rate also comprises a second sub-step of calculating a pressure variation in a control chamber of the injector based on the voltage variation at the terminals of the electric actuator.

4. The method as claimed in claim 3, wherein the step of determining the static flow rate also comprises a third sub-step of determining the static flow rate of the injector, starting from the voltage variation and a table of static flow rate reference values of a piezo-electric injector.

5. The method as claimed in claim 3, wherein, when an absolute value of a difference between the determined static flow rate of the injector and a nominal static flow rate of an injector is greater than a predetermined threshold, the method further comprises a supplementary step of generating an alert.

6. The method as claimed in claim 3, wherein the injection system also comprises a fuel supply rail, and wherein a pressure of the fuel in the fuel supply rail is controlled according to the static flow rate of the injector.

7. The method as claimed in claim 2, wherein the step of determining the static flow rate also comprises a third sub-step of determining the static flow rate of the injector, starting from the voltage variation and a table of static flow rate reference values of a piezo-electric injector.

8. The method as claimed in claim 7, wherein, when an absolute value of a difference between the determined static flow rate of the injector and a nominal static flow rate of an injector is greater than a predetermined threshold, the method further comprises a supplementary step of generating an alert.

9. The method as claimed in claim 2, wherein, when an absolute value of a difference between the determined static flow rate of the injector and a nominal static flow rate of an injector is greater than a predetermined threshold, the method further comprises a supplementary step of generating an alert.

10. The method as claimed in claim 2, wherein the injection system also comprises a fuel supply rail, and wherein a pressure of the fuel in the fuel supply rail is controlled according to the static flow rate of the injector.

11. The method as claimed in claim 1, wherein, when an absolute value of a difference between the determined static flow rate of the injector and a nominal static flow rate of an injector is greater than a predetermined threshold, the method further comprises a supplementary step of generating an alert.

12. The method as claimed in claim 1, wherein the injection system also comprises a fuel supply rail, and wherein a pressure of the fuel in the fuel supply rail is controlled according to the static flow rate of the injector.

13. A non-transitory, non-volatile computer-readable medium on which is stored a computer program that, when executed by a computer, causes the computer to implement the method of claim 1.

14. A method for determining a static flow rate of a piezo-electric injector of a combustion engine injection system, the piezo-electric injector comprised of a needle and a piezo-electric actuator that controls a valve of the injector, the injection system also including an electric generator that sends electric current pulses to the piezo-electric actuator of the injector, and a voltage sensor that measures voltage values at terminals of the piezo-electric actuator, the method comprising the steps of:

determining a duration between an instant of closure of the valve and an instant of closure of the needle; and determining a temperature of the engine;

determining an engine speed; and if i) the determined duration between the instant of closure of the valve and the instant of closure of the needle is greater than a predetermined threshold, ii) the temperature of the engine is between a first predetermined temperature and a second predetermined temperature, and iii) the engine speed is between a first predetermined speed of rotation and a second predetermined speed of rotation, then:

sending, via the electric generator, an electric current pulse to the piezo-electric actuator, such that the piezo-electric actuator contacts the valve without opening the valve, the electric generator sending the electric current pulse during a time of an injection cycle of the injector when the needle is returning from an open position to a closed position, measuring, via the voltage sensor, a plurality of voltage values of the piezo-electric actuator, and determining the static flow rate of the piezo-electric injector based on the plurality of voltage values measured of the piezo-electric actuator.

15. The method as claimed in claim 14, wherein, when an absolute value of a difference between the determined static flow rate of the injector and a nominal static flow rate of an injector is greater than a predetermined threshold, the method further comprises a supplementary step of generating an alert.

16. A computer for controlling a combustion engine injection system that comprises a fuel supply rail, a piezo-electric injector equipped with a needle and a piezo-electric actuator that controls a valve of the injector, an electric generator that sends electric current pulses to the piezo-electric actuator of the injector, and a voltage sensor that measures voltage values at the terminals of the piezo-electric actuator, the computer configured to implement the steps of the method as claimed in claim 1.

17. A combustion engine, comprising:

an injection system, comprised of a piezo-electric injector that includes a needle and a piezo-electric actuator that controls a valve of the injector, the injection system also comprised of a fuel supply rail, an electric generator that sends electric current pulses to the piezo-electric actuator of the injector, and a voltage sensor that measures voltage values at the terminals of the piezo-electric actuator; and a computer that controls the injection system, the computer configured to send, via the electric generator, an electric current pulse to the piezo-electric actuator, such that the piezo-electric actuator contacts the valve without opening the valve, the electric generator sending the electric current pulse during a time of an injection cycle of the injector when the needle is returning from an open position to a closed position;

measure, via the voltage sensor, a plurality of voltage values of the piezo-electric actuator; and determine the static flow rate of the piezo-electric injector based on the plurality of voltage values measured of the piezo-electric actuator.

* * * * *